(12) United States Patent
Wangemann et al.

(10) Patent No.: US 10,359,119 B2
(45) Date of Patent: Jul. 23, 2019

(54) HIGH PRESSURE VALVE

(71) Applicant: Holter Regelarmaturen GmbH & Co. KG, Holte-Stukenbrock (DE)

(72) Inventors: Matthias Wangemann, Schloβ Holte (DE); Andreas Müller, Steinheim (DE); Michaela Vogt, Schloβ Holte-Stukenbrock (DE)

(73) Assignee: HOLTER REGELARMATUREN GMBH & CO. KG, Schloss Holte-Stukenbrock (DE)

( * ) Notice: Subject to any disclaimer, the term of this patent is extended or adjusted under 35 U.S.C. 154(b) by 0 days.

(21) Appl. No.: 14/431,928

(22) PCT Filed: Sep. 28, 2012

(86) PCT No.: PCT/EP2012/004073
§ 371 (c)(1),
(2) Date: Mar. 27, 2015

(87) PCT Pub. No.: WO2014/048446
PCT Pub. Date: Apr. 3, 2014

(65) Prior Publication Data
US 2015/0292628 A1    Oct. 15, 2015

(51) Int. Cl.
*F16K 1/46* (2006.01)
*F16K 1/42* (2006.01)

(52) U.S. Cl.
CPC ............... *F16K 1/46* (2013.01); *F16K 1/42* (2013.01); *Y10T 137/86759* (2015.04)

(58) Field of Classification Search
CPC ....... F16K 1/42; F16K 1/46; Y10T 137/86759

USPC ..................... 251/359; 137/625.33
See application file for complete search history.

(56) References Cited

U.S. PATENT DOCUMENTS

| | | | | | |
|---|---|---|---|---|---|
| 2,985,424 | A | * | 5/1961 | Anderson | F16K 1/34 251/332 |
| 3,070,120 | A | * | 12/1962 | Wendt | F16K 1/46 137/516.29 |
| 4,154,426 | A | * | 5/1979 | Santy | F16J 15/32 251/175 |

(Continued)

FOREIGN PATENT DOCUMENTS

| | | |
|---|---|---|
| DE | 2645659 | 4/1978 |
| EP | 882916 | 12/1998 |

(Continued)

OTHER PUBLICATIONS

International Search Report for PCT Application PCT/EP2012/004073, EPO, dated Jun. 25, 2013.

*Primary Examiner* — Michael R Reid
*Assistant Examiner* — Christopher D Ballman

(57) ABSTRACT

The high pressure valve (1) has a high pressure region (2) and a low pressure region (3) and a shut-off element (4). The shut-off element (4) is designed for closing and opening a fluid connection between the high pressure region (2) and the low pressure region (3) and to this end it can be moved in an axial direction (Z) between a closed closure position and an opened opening position. A seat gasket (9) is provided to form a seal in the closure position. The seat gasket (9) is a compression sealing seat gasket (9) which is affixed to the shut-off element (4) and is arranged in a recess provided in the shut-off element (4).

6 Claims, 3 Drawing Sheets

(56) References Cited

U.S. PATENT DOCUMENTS

| | | | |
|---|---|---|---|
| 4,249,717 A | 2/1981 | Thompson | |
| 4,688,757 A | 8/1987 | Cook et al. | |
| 4,915,355 A * | 4/1990 | Fort | F16K 1/46 |
| | | | 251/356 |
| 6,811,140 B1 * | 11/2004 | Maini | F16K 43/008 |
| | | | 251/214 |
| 6,935,369 B1 * | 8/2005 | Kremer | F16K 1/303 |
| | | | 137/625.3 |
| 2008/0029171 A1 * | 2/2008 | Weyer | F16K 31/1262 |
| | | | 137/625.33 |
| 2012/0037832 A1 * | 2/2012 | Sauer | F16J 15/061 |
| | | | 251/359 |
| 2013/0248751 A1 * | 9/2013 | Anderson | F16K 1/465 |
| | | | 251/359 |
| 2014/0264137 A1 * | 9/2014 | Linser | F16J 15/164 |
| | | | 251/359 |

FOREIGN PATENT DOCUMENTS

| | | |
|---|---|---|
| WO | WO 0131239 | 5/2001 |
| WO | WO 0146608 | 6/2001 |

\* cited by examiner

HIGH PRESSURE VALVE

TECHNICAL FIELD

The invention relates to a high-pressure valve and more particularly, to a high-pressure valve wherein a seat seal is provided in a recess on a shut-off element such that the fluid flowing through the high-pressure valve does not flow against the seal in the open state.

BACKGROUND INFORMATION

Corresponding valves have a high-pressure region, a low-pressure region, and a piston-shaped shut-off element disposed in a piston housing between the high-pressure region and the low-pressure region. The end position of this shut-off element must be sealed appropriately because of the great pressure difference, so that the valve securely separates the high-pressure region from the low-pressure region.

A valve of the stated type is known from EP 882 916, in which valve the seat seal is formed by a seal that is disposed in the valve seat of the valve, so that the piston is axially moved against the seat seal when the valve closes, so that the piston lies against the seat seal with its face side. In the open state of the valve, the seat seal is exposed and therefore the flowing medium can flow directly against it at high pressure; consequently, the known seat seal is subject to increased wear and must be replaced frequently.

SUMMARY OF THE INVENTION

The invention is therefore based on the task of indicating a high-pressure valve of the type indicated initially and a seat seal with which the problems described are avoided.

According to the invention, the seat seal is provided in a recess on the shut-off element. In this way, the result is achieved that the fluid flowing through the high-pressure valve does not flow against the seal in the open state.

Preferably, the recess is opened by means of a ring-shaped opening on the valve-seat side of the shut-off element that is particularly formed as a piston. In this connection, the seat seal preferably has a ring-shaped projection or collar that extends radially outward and closes off the ring-shaped opening, at least in part. In this way, a projection provided on the valve seat can be brought to lie against the seat seal in the closed position, the projection also being configured in ring shape and disposed on the valve seat in such a manner that it projects into the ring-shaped opening, at least in part. In this manner, the seat seal is practically encapsulated in the face side of the shut-off element, and, with the collar-shaped projection in the ring-shaped opening, has only a relatively small surface area that is exposed on the shut-off element. This surface area is ultimately delimited by the width of the ring gap that forms the ring-shaped opening. In this manner, the surface area of the seal against which flow is possible at all, and which is therefore exposed to wear by flowing fluid is minimized, as is the closing and opening force that must be applied.

a. The passages for the fluid that stands under high pressure particularly lie above the valve seat, so that the side of the end position seal that faces the valve seat experiences practically no flow against it in the open state and is therefore protected. For this purpose, it is advantageously provided that the shut-off element has a wall section that encloses the seat seal radially on the outside, which section, together with the face-side section of the shut-off element, forms the ring-shaped opening. In this connection, the wall section extends in the axial direction of the piston-shaped shut-off element and has a face-side contact surface that is particularly disposed approximately flush with the sealing surface of the projection of the seat seal that faces the valve seat. In the closed state, the contact surface lies against the valve seat radially on the outside, next to the projection of the valve seat, with fluid under high pressure being able to pass through between contact surface and valve seat and to enter into the recess in which the seat seal is accommodated.

b. It is advantageous if the seat seal is configured to be self-sealing, in that it is surrounded by a flexible element, particularly an O-ring-shaped element. When the fluid enters into the recess through the ring-shaped opening, as described above, this flexible element is deformed by the pressure and pressed against the seat seal, thereby particularly causing the flexible element to be pressed against the arc-shaped projection of the seat seal that lies against the projection of the valve seat and the required sealing effect to be developed.

Preferably, the wall section has a rounded part on its face-side edge, which lies radially on the outside, so that the flow that comes from the high-pressure side can flow around this wall section free of eddies, to the greatest possible extent, in the direction of the low-pressure side, and thereby the seat seal is additionally protected.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
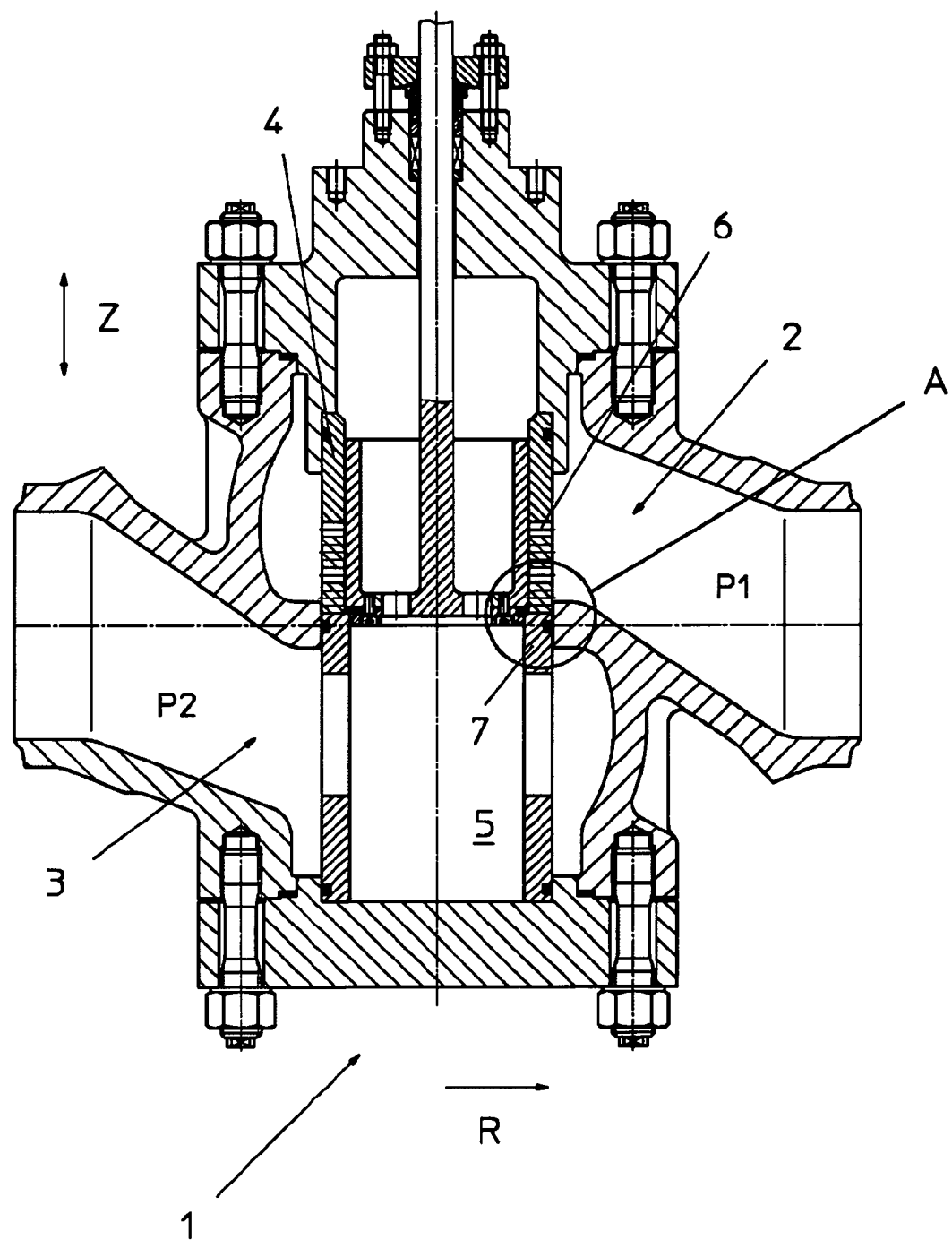
FIG. 1 shows a section through a high-pressure valve according to the invention.

The high-pressure valve 1 (called "valve" hereinafter) shown in FIG. 1 has a high-pressure side 2 having a pressure p1 applied there and a low-pressure side 3 having a pressure p2 prevailing there, where it holds true that in the closed position p1>p2. The valve 1 has a piston-shaped shut-off element 4 that is mounted to be displaceable in the axial direction Z, to open and close the valve 1 in a housing 5, particularly a cylindrical housing. When the valve 1 is opened, the fluid (gas or liquid) flows through the housing 5 from the high-pressure side 2 to the low-pressure side 3, through openings 6 in the housing wall. For closing, the shut-off element 4 is pushed in the direction Z, toward the valve seat 7.

Figure 2:
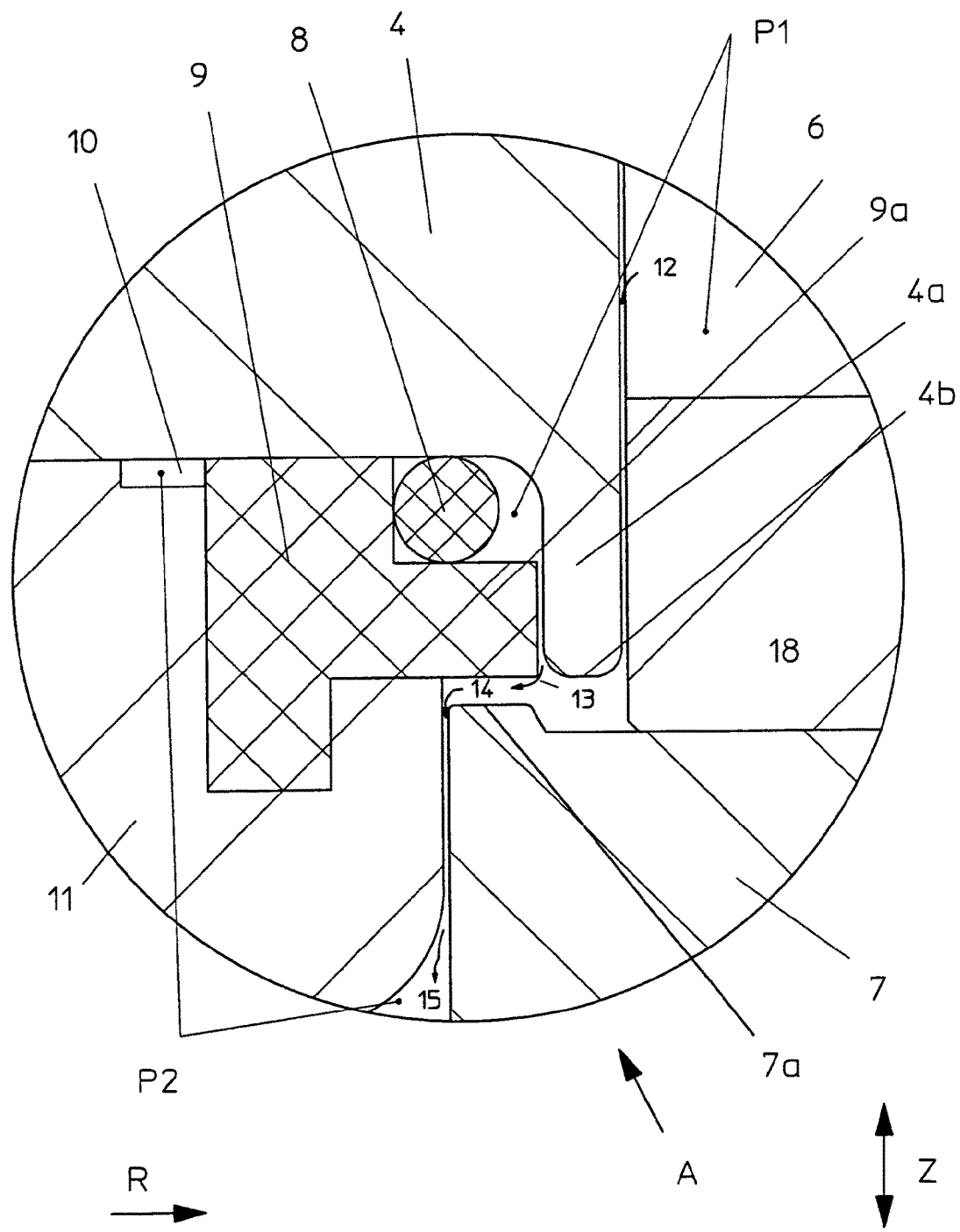
FIG. 2 shows a detail enlargement of the detail A from FIG. 1 in the region of the valve seat in an open position.

FIG. 2 shows the open position. On the face side facing the valve seat 7, the shut-off element 4 has a recess into which a seat seal 9 is inserted. The recess is open toward the valve seat 7. The said recess is open between the wall section 4a, which lies on the outside in the radial direction R, extends in the axial direction Z here, and is configured as a piston wall, and a head section 11 configured on the face side of the shut-off element 4, and forms a ring gap or ring-shaped opening at this location. This opening is narrower than the seat seal, so that the latter cannot be pressed out of the recess, even under pressure. The head section 11 can thereby be released from the shut-off element 4, for installation and removal of the seat seal 9. The connection between head section 11 and shut-off element 4 is particularly fluid-permeable, for which reason the low pressure p2 is applied in the excess pressure equalization region 10 that borders on the recess.

A part of the seat seal 9, namely a collar-shaped projection 9a of the seat seal 9 that extends radially outward, projects into the ring-shaped opening and closes off the ring gap, at least in part. A flexible element 8, particularly an O-ring-shaped element, is provided in the recess on the side of the projection 9 that faces away from the valve seat 7, which element encloses the seat seal 9 radially on the outside. Flexible means that the element 8 consists of a material, for example NBR, EPDM, FKM, which can be deformed significantly more easily under pressure (fluid pressure of the high-pressure side) than the end position seal itself, which consists of a relatively more rigid material, particularly, for example, PTFE.

In the open state shown in FIG. 2, the fluid gets from the high-pressure side to the low-pressure side through the openings 6, by way of the flow path shown by the arrows 12, 13, 14, and 15, with the flow running through between the shut-off element and the housing wall 18, see item 12, around the wall section 4a at 13 and the valve seat 7 at 14, and past the head section 11 at 15. As can be seen in the example shown, the face side 4b of the wall section is particularly rounded off radially on the outside and/or also radially on the inside, so that the fluid flowing around this side 4b can flow past the exposed part 9a of the seal free of eddies, to the greatest possible extent, and wear on the seal is minimized.

Figure 3:
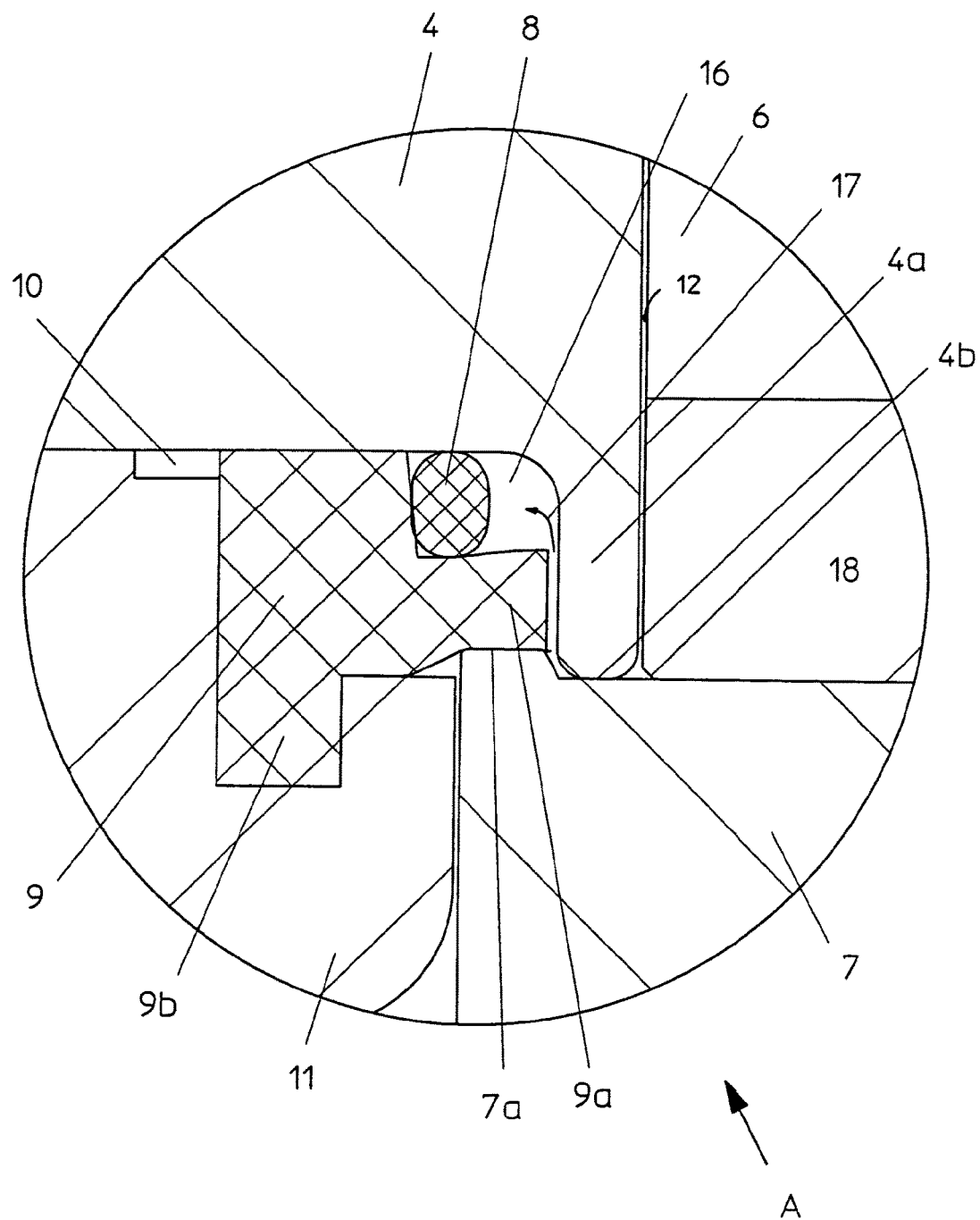
FIG. 3 shows a detail enlargement of the detail A from FIG. 1 in the region of the valve seat in a closed position.

On the valve seat, a projection 7a can be seen, which is designed in such a manner that it can be immersed in the ring-shaped opening and lie against the seat seal 9, on its projection 9a, in the closed position of the valve 1. This situation is shown in FIG. 3. The fluid from the high-pressure side now gets through the opening 6 (arrow 12) and flows around the wall section 4a and its face side 4b. Fluid can flow through between the face side 4b that lies against the valve seat 7, and gets into the recess 16 (arrow 17). In this way, the flexible element 8 is deformed by high pressure and pressed against the seat seal 9, which is displaced, on the one hand, in the direction of the escape region 10, and the projection 9a of which is pressed in the direction of the valve seat 7 by means of the pressing effect of the element 8. As a result, the projection 9a is pressed against the projection 7a of the valve seat that is immersed in the ring gap, so that the end position seal 9 prevents flow into the low-pressure region in self-sealing manner.

Accordingly, the present invention provides a valve having a seat seal provided in a recess on a shut-off element of the valve. In this way, the result is achieved that the fluid flowing through the high-pressure valve does not flow against the seal in the open state.

Modifications and substitutions by one of ordinary skill in the art are considered to be within the scope of the present invention, which is not to be limited except by the allowed claims and their legal equivalents.

The invention claimed is:

1. A high-pressure valve (1), having a high-pressure region (2) and a low-pressure region (3), a shutoff element (4) configured as a piston and disposed in a central region of said high-pressure valve (1) between said high-pressure region (2) and said low-pressure region (3), said shutoff element (4) having a face side (4b) that faces a valve seat (7), said shut-off element (4) face side (4b) configured for closing and opening a fluid connection between the high-pressure region (2) and the low-pressure region (3), said shut-off element (4) configured for being moved in an axial direction (Z) between a closed position and an open position, wherein a seat seal (9) is coupled to the shut-off element (4) and is configured for sealing said fluid connection between the high-pressure region (2) and the low-pressure region (3) in the closed position of the shut-off element;

said high-pressure valve further including an O-ring shaped flexible and deformable element (8) disposed in a recess (16) provided in the shut-off element (4) abutting on a first side against said seat seal (9), said O-ring shaped flexible and deformable element (8) having a generally circular cross-section and is radially enclosed and spaced apart from, on an outside region, by a wall section (4a) of the shut-off element (4), which wall section, together with the face-side section (4b) of the shut-off element (4), forms a ring-shaped fluid opening, wherein a ring-shaped projection (7a) is formed on the valve seat (7), said ring-shaped projection (7a) on said valve seat (7) having a height greater than a generally planar surface of a remainder of said valve seat (7), characterized in that the seat seal (9) is surrounded by and abuts the first side of the O-ring shaped flexible and deformable element (8) disposed in said recess (16), said O-ring shaped flexible and deformable element (8) deformable in both an axial (Z) direction and a radial (R) direction, and wherein said seat seal (9) has a collar-shaped radially extending projection (9a) that extends outward in the radial direction (R) from said seat seal 9, said collar-shaped radially extending projection (9a) configured for closing off the ring-shaped opening, at least in part, and wherein the flexible and deformable element (8) is configured for being deformed in both said radial direction (R) and said axial direction (Z) when a fluid at high pressure from said high-pressure region (2) enters through the ring-shaped opening into the recess (16) and applies pressure against a second side of said O-ring shaped flexible and deformable element (8) disposed in said recess (16) when said shut-off element is in the closed position, and wherein said radially and axially deformed O-ring shaped flexible and deformable element (6) presses axially against an inner wall of the shut-off element (4) and axially against the collar-shaped radially extending projection (9a) of the seat seal (9) moving said collar-shaped radially extending projection (9a) of the seat seal (9) downward in the axial direction (Z), thereby causing the collar-shaped radially extending projection (9a) of the seat seal (9) to be pressed downwardly against the ring-shaped projection (7a) of the valve seat (7), and at least in part, said ring-shaped projection (7a) making contact with the seat seal (9), so that the required sealing effect is developed, in the form of a pressure-sealing as well as self-sealing seat seal (9).

2. The high-pressure valve (1) according to claim 1, characterized in that the recess (16) and the seat seal (9) are dimensioned in such a manner that in the closed position of the valve (1), the product of the fluid pressure above the projection (9a) of the seat seal (9) and of the surface area of the projection (9a) of the seat seal (9), to which pressure is thereby applied, is greater than the product of the common contact surface between the projection (9a) of the seat seal (9) with the valve seat (7, 7a) and the fluid pressure prevailing there.

3. The high-pressure valve (1) according to claim 1, characterized in that the wall section (4*a*) has a rounded part on its face-side edge (4*b*) that lies radially on the outside.

4. The high-pressure valve (1) according to claim 1, characterized in that the shut-off element (4) has a head section (11) that surrounds at least one section (9*b*) of the seat seal (9).

5. The high-pressure valve (1) according to claim 4, characterized in that the seat seal (9) is enclosed in a chamber by the head section (11), wherein, in order to secure the seat seal (9), it is inserted into the head section (11) with its section (9*b*), with shape fit.

6. The high-pressure valve (1) according to claim 1, characterized in that the O-ring shaped flexible and deformable element (8) consists of a material that can be deformed more easily than a material from which the seat seal (9) itself is manufactured.

* * * * *